US011811879B2

(12) United States Patent
Awate et al.

(10) Patent No.: US 11,811,879 B2
(45) Date of Patent: *Nov. 7, 2023

(54) NETWORKING CONNECTION MANAGEMENT BASED ON CONTAINER IDENTIFICATION

(71) Applicant: Nicira, Inc., Palo Alto, CA (US)

(72) Inventors: Nilesh Awate, Pune (IN); Vivek Parikh, Pune (IN); Amit Vasant Patil, Pune (IN); Vaibhav Rekhate, Pune (IN)

(73) Assignee: Nicira, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,228

(22) Filed: May 16, 2022

(65) Prior Publication Data

US 2022/0279044 A1    Sep. 1, 2022

Related U.S. Application Data

(63) Continuation of application No. 16/125,792, filed on Sep. 10, 2018, now Pat. No. 11,336,733.

(30) Foreign Application Priority Data

Jun. 21, 2018    (IN)    ............................ 201841023152

(51) Int. Cl.
| | | |
|---|---|---|
| *G06F 15/16* | (2006.01) | |
| *H04L 67/141* | (2022.01) | |
| *G06F 9/455* | (2018.01) | |
| *H04L 45/302* | (2022.01) | |
| *H04L 45/745* | (2022.01) | |
| *H04L 45/00* | (2022.01) | |
| *H04L 61/4552* | (2022.01) | |

(Continued)

(52) U.S. Cl.
CPC ........ *H04L 67/141* (2013.01); *G06F 9/45558* (2013.01); *H04L 45/306* (2013.01); *H04L 45/72* (2013.01); *H04L 45/745* (2013.01); *H04L 61/4552* (2022.05); *G06F 2009/45562* (2013.01); *H04L 67/10* (2013.01); *H04L 2101/365* (2022.05)

(58) Field of Classification Search
CPC ... H04L 67/141; H04L 67/10; H04L 61/4552; H04L 45/306; H04L 45/72; H04L 45/745; H04L 2101/365; G06F 9/45558; G06F 2009/45562
USPC ................................. 709/202–203, 227–228
See application file for complete search history.

(56) References Cited

U.S. PATENT DOCUMENTS

| | | |
|---|---|---|
| 4,901,231 A | 2/1990 | Bishop et al. |
| 10,298,681 B1 | 5/2019 | Makin et al. |

(Continued)

*Primary Examiner* — Bharat Barot

(57) ABSTRACT

Described herein are systems, methods, and software to enhance packet processing. In one implementation, a host computing element identifies a packet from a process executing on the host computing element. In response to identifying the packet, the host computing element determines whether the packet originates from a container namespace corresponding to a container on the host computing element or a host namespace corresponding to the host computing element. If the packet originates from a container namespace, the host computing element may determine supplemental information for the container associated with the container namespace, and process the packet based on the supplemental information.

20 Claims, 6 Drawing Sheets

(51) Int. Cl.
  *H04L 67/10* (2022.01)
  *H04L 101/365* (2022.01)

(56) References Cited

U.S. PATENT DOCUMENTS

| | | | |
|---|---|---|---|
| 10,356,214 | B2 | 7/2019 | Joshi et al. |
| 10,476,745 | B1 * | 11/2019 | McCormick ........ H04L 67/1001 |
| 11,012,310 | B2 | 5/2021 | Fandli et al. |
| 11,075,857 | B2 * | 7/2021 | Mestery .............. H04L 61/4511 |
| 11,088,988 | B2 * | 8/2021 | Chuu .................... H04L 61/256 |
| 11,336,733 | B2 * | 5/2022 | Awate ................... H04L 67/141 |
| 2012/0307828 | A1 | 12/2012 | Agarwal et al. |
| 2013/0304805 | A1 * | 11/2013 | Arai ........................ H04L 45/76 |
| | | | 709/203 |
| 2016/0094460 | A1 | 3/2016 | Shelar et al. |
| 2018/0210801 | A1 | 7/2018 | Wu et al. |
| 2019/0052598 | A1 | 2/2019 | Hira et al. |
| 2019/0097966 | A1 | 3/2019 | Hu et al. |
| 2019/0104104 | A1 | 4/2019 | Kapadia et al. |
| 2019/0354623 | A1 | 11/2019 | Chen |
| 2019/0372848 | A1 | 12/2019 | McCormick et al. |
| 2020/0019410 | A1 | 1/2020 | Dima et al. |

* cited by examiner

| CONTAINER TYPE 510 | CONTAINER ID 511 | ABSOLUTE PATH 512 | SUPPLEMENTAL ADDRESSING INFO 513 | ACTIONS 514 |
|---|---|---|---|---|
| TYPE 520 | ID 525 | PATH 530 | ADDRESS INFO 535 | PERMIT |
| TYPE 521 | ID 526 | PATH 531 | ADDRESS INFO 536 | BLOCK |
| TYPE 522 | ID 527 | PATH 532 | ADDRESS INFO 537 | BLOCK |
| TYPE 523 | ID 528 | PATH 533 | ADDRESS INFO 538 | PERMIT |
| TYPE 524 | ID 529 | PATH 534 | ADDRESS INFO 539 | PERMIT |

DATA STRUCTURE 500

FIGURE 5

NETWORKING CONNECTION MANAGEMENT BASED ON CONTAINER IDENTIFICATION

RELATED APPLICATIONS

This application is a continuation of U.S. application Ser. No. 16/125,792 entitled "NETWORKING CONNECTION MANAGEMENT BASED ON CONTAINER IDENTIFICATION" filed Sep. 10, 2018, which itself claims priority under 35 U.S.C. 119(a)-(d) to Foreign Application Serial No. 201841023152 filed in India entitled "NETWORKING CONNECTION MANAGEMENT BASED ON CONTAINER IDENTIFICATION", on Jun. 21, 2018, by Nicira, Inc., which are both incorporated herein by reference for all purposes.

BACKGROUND

Virtualization techniques have gained popularity and are now commonplace in data centers and other computing environments, increasing the efficiency with which physical computing resources are used. These virtualization techniques may include the deployment of virtual machines, containers, and software defined networks that together can provide the desired operations of a particular organization.

In some implementations, organizations may deploy containers on at least one host computing element, such as a physical computing system or virtual machine, to provide various operations, including data processing, front-end webservice applications, database applications, or some other similar applications. These containers may share resources from the host computing element, wherein the resources may include kernel resources from the host operating element, and may further include repositories and other approved resources that can be shared with other containers or processes executing on the host. However, although resources may be shared between the containers on a host, the containers are provisioned to have private access to the operating system with their own identifier space (hereinafter namespace), file system structure, and network interfaces. The operating system may also be responsible for allocating processing resources, memory resources, network resources, and other similar resources to the containerized endpoint.

However, while containers provide an efficient virtualization technique to deploy multiple applications on the same host computing element, difficulties often arise in managing the communications of each of the deployed containers. In particular, the kernel of the host operating system may have difficulties in identifying which process initiates the communication, and whether the communication should be permitted.

OVERVIEW

The technology disclosed herein enhances the processing of packets from containers in a host computing element. In one implementation, a method of processing packets in a host computing element includes identifying, in a kernel of the host computing element, a packet for communication to a second computing element. The method further includes determining whether the packet originates from a process in a container namespace corresponding to a container on the host computing element or a process in a host namespace corresponding to the host computing element based on process identifier numbers associated with the process. When the packet originates from a container namespace, the method also provides determining supplemental information for a container associated with the container namespace, and processing the packet in the kernel of the host computing element based on the supplemental information.

BRIEF DESCRIPTION OF THE DRAWINGS

FIG. 5 illustrates a data structure for managing packets according to an implementation.

DETAILED DESCRIPTION

Figure 1:
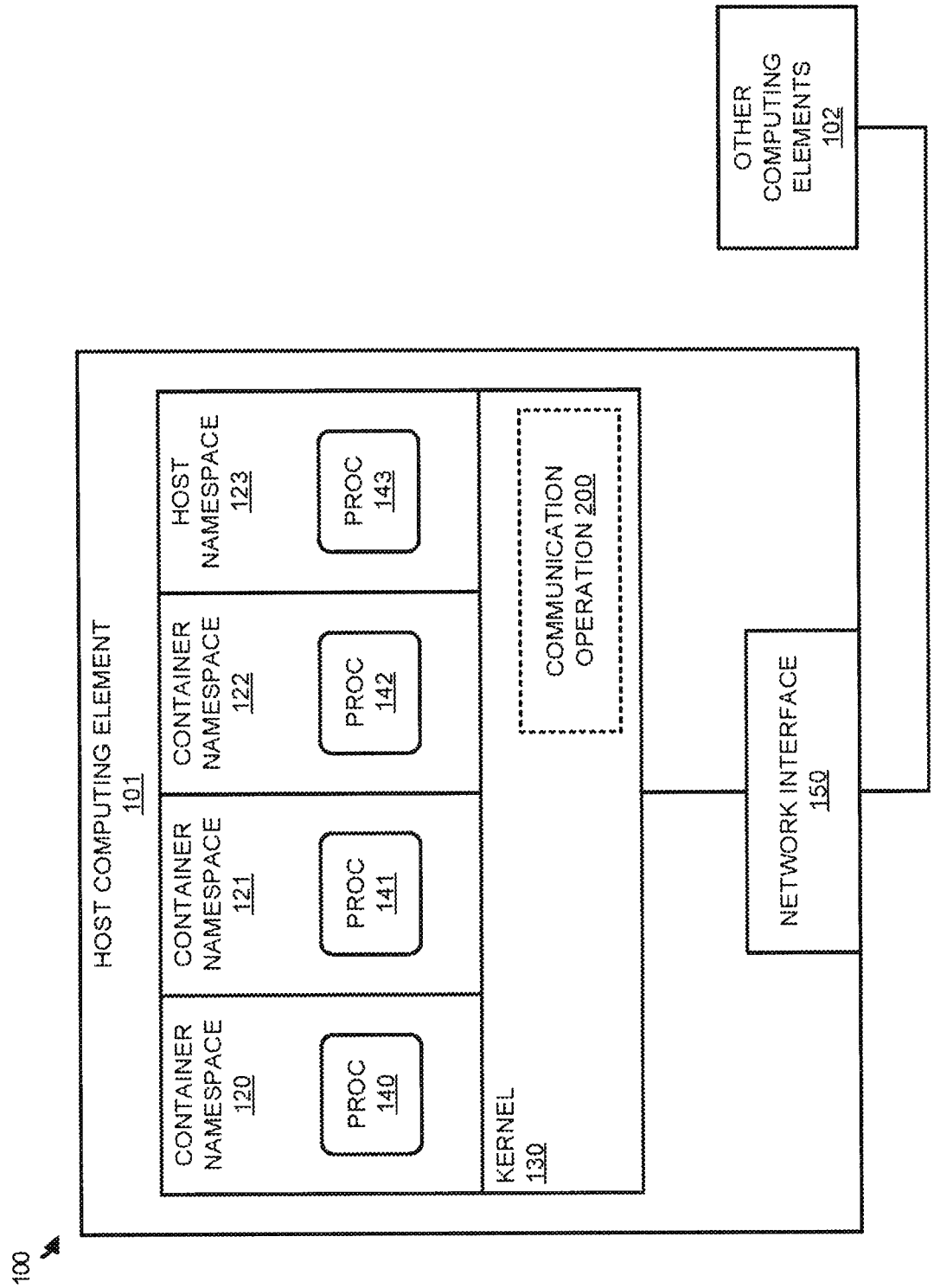
FIG. 1 illustrates a computing environment to manage connection packets in a host computing element according to an implementation.

FIG. 1 illustrates a computing environment 100 to manage connection packets in a host computing element according to an implementation. Computing environment 100 includes host computing element 101 and other computing elements 102. Host computing element 101 includes network interface 150, kernel 130, container namespaces 120-122, and host namespace 123. Host computing element 101 may comprise a physical computing system, or may comprise a virtual machine in some examples. Kernel 130 is representative of an operating system kernel capable of implementing operation 200 further described in claim 1.

In operation, containers execute on host computing element 101 to efficiently use the resources of the host computing element, wherein each of the containers may comprise Docker containers, Linux containers, or some other similar type of containerized endpoint. Each of the containers share resources from host computing element 101, wherein the resources may include kernel resources from the host operating system, and may further include repositories and other approved resources that can be shared with other containers or processes executing on the host. However, although resources may be shared between the containers on a host, the containers are provisioned to have private access to the operating system with their own namespace, file system structure, and network interfaces. The operating system may also be responsible for allocating processing resources, memory resources, network resources, and other similar resources to the containerized endpoint.

Here, each container executing on host computing element 101 is associated with a corresponding namespace 120-122, wherein each namespace of namespaces 120-122 allocates unique process identification numbers (PID) to processes executing therein. For example, processes (PROC) 140 executing in container namespace 120 may be allocated PIDs specific to the container namespace, while processes 141-142 in corresponding container namespaces 121-122 may be allocated PIDs specific to their container namespace. In addition to the PIDs that are unique to each of the namespaces, each process of processes 140-142 executing within the containers may also be allocated a PID that corresponds to the global namespace of host computing element 101. In particular, to ensure that each process executing on host computing element 101 is identified by kernel 130, processes in containers 120-122 as well as in host namespace 123 are each allocated a unique global PID. In the case of containers, this global PID is different than the PID that is allocated in the local container namespace, whereas for processes operating in host namespace 123, the host PID will be equivalent to the global PID. These PID traits for each of the processes executing on host computing element 101 may be used by kernel 130 to determine how to process communication packets as further described in operation 200 of FIG. 2.

Figure 2:
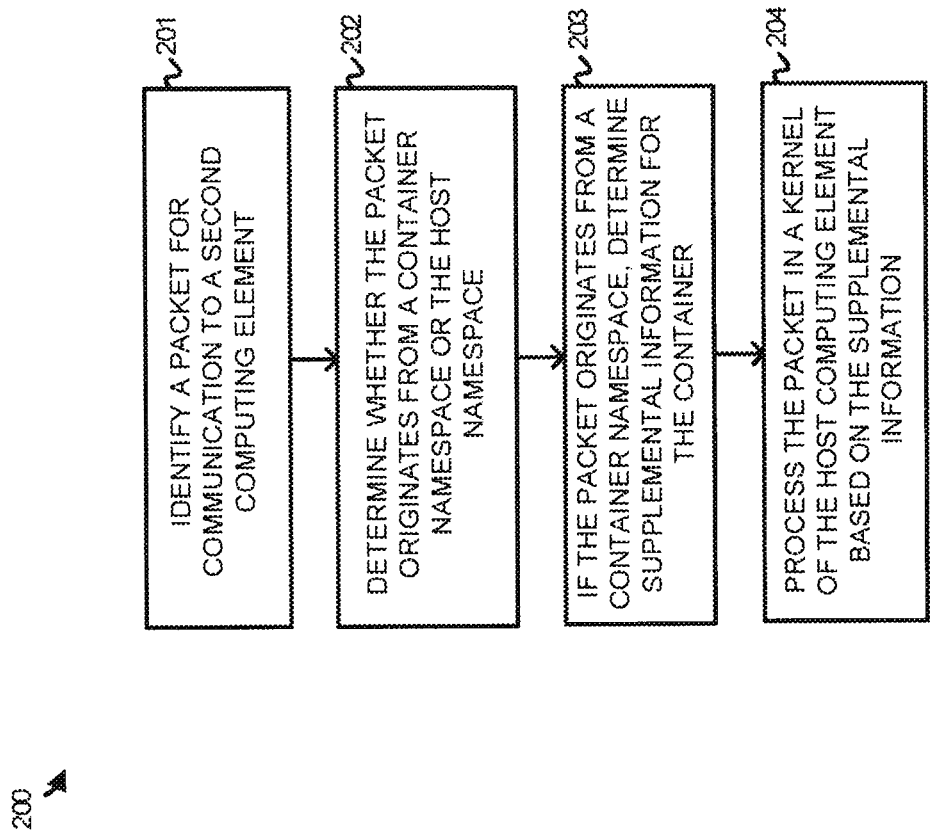
FIG. 2 illustrates a communication operation of a computing element according to an implementation.

FIG. 2 illustrates a communication operation 200 of a computing element according to an implementation. Operation 200 is described parenthetically in the paragraphs that follow with reference to systems and elements of computing environment 100 of FIG. 1.

As depicted, communication operation 200, which executes as part of kernel 130, includes identifying (201) a packet for communication to a second computing element from a container executing on host computing element 101. This other computing element may comprise another container, a virtual machine, or a physical computing system in some examples. Once identified, operation 200 determines (202) whether the packet originates from a container namespace corresponding to a container or a host namespace corresponding to the host computing element. In some implementations, when a packet is identified, kernel 130 may determine whether the packet comprises a connection establishment packet, such as an acknowledgment or synchronization packet for Transmission Control Protocol (TCP), to establish a communication with another computing element. Once it is determined that the packet comprises a connection establishment packet, kernel 130 may then determine the origination of the packet and continue with operation 200.

As an example, a process in processes 140 may initiate a transfer of a packet that is identified by kernel 130. When the packet is identified, operation 200 may determine whether the packet comprises a connection establishment packet, and when the packet comprises a connection establishment packet, determine whether the packet originates from a container namespace or the host namespace. In some implementations, to determine what namespace a packet originates from, communication operation 200 may use PIDs that are allocated to the particular process. Specifically, communication operation 200 may identify a PID that corresponds to the process in the local namespace. Using the previous example, the local PID would comprise the PID that is local to container namespace 120. Additionally, communication operation 200 may identify a global namespace PID for the process, wherein the global PID uniquely identifies the process from all processes executing on host computing element 101. Once the global PID and the local PID are identified for the requesting process, the two PIDs may be compared to determine whether the packet originated from a container namespace of container namespaces 120-122 or host namespace 123. If the PIDs match, then the packet will be identified as originating from host namespace 123, as the global namespace PID would be identical to the local namespace PID for the packet (no unique container PID). In contrast, it the PIDs did not match, operation 200 may identify that the packet originates from a container on host computing element 101 and may continue with operation 200.

Once a packet is identified as originating from a container executing on host computing element 101, operation 200 determines (203) supplemental information for the container corresponding to the packet. This supplemental information may include information about the type of container, information about a container identifier (ID) in relation to other containers executing on host computing element, a cryptograph hash for the process, or an absolute binary path for the process on host computing element 101, which identifies the execution point of the process on the host computing element. After identifying the supplemental information, operation 200 processes (204) the packet based on the supplemental information obtained for the packet. In some implementations, in processing the packet, communication operation 200 may use one or more data structures, such as tables, arrays, and the like, to compare the supplemental information to rules maintained by host computing element 101. For example, the absolute binary path corresponding to a packet may be compared to one or more data structures to determine whether a communication is permitted, whether the communication should be blocked, or any other similar action on the communication. Thus, if the communication is permitted, then the communication may be forwarded to another computing element, wherein the computing element may comprise another container, a virtual machine, a physical computing element, or some other type of computing element.

In at least some implementations, to configure the kernel with the appropriate policies for processing the packet, a manager may be used that can distribute the required policies to each of the individual host computing elements. Accordingly, based on the applications and containers operating on each of the systems, the manager may be responsible for ensuring appropriate connections are permitted, blocked, or otherwise modified to provide the desired operation.

Figure 3:
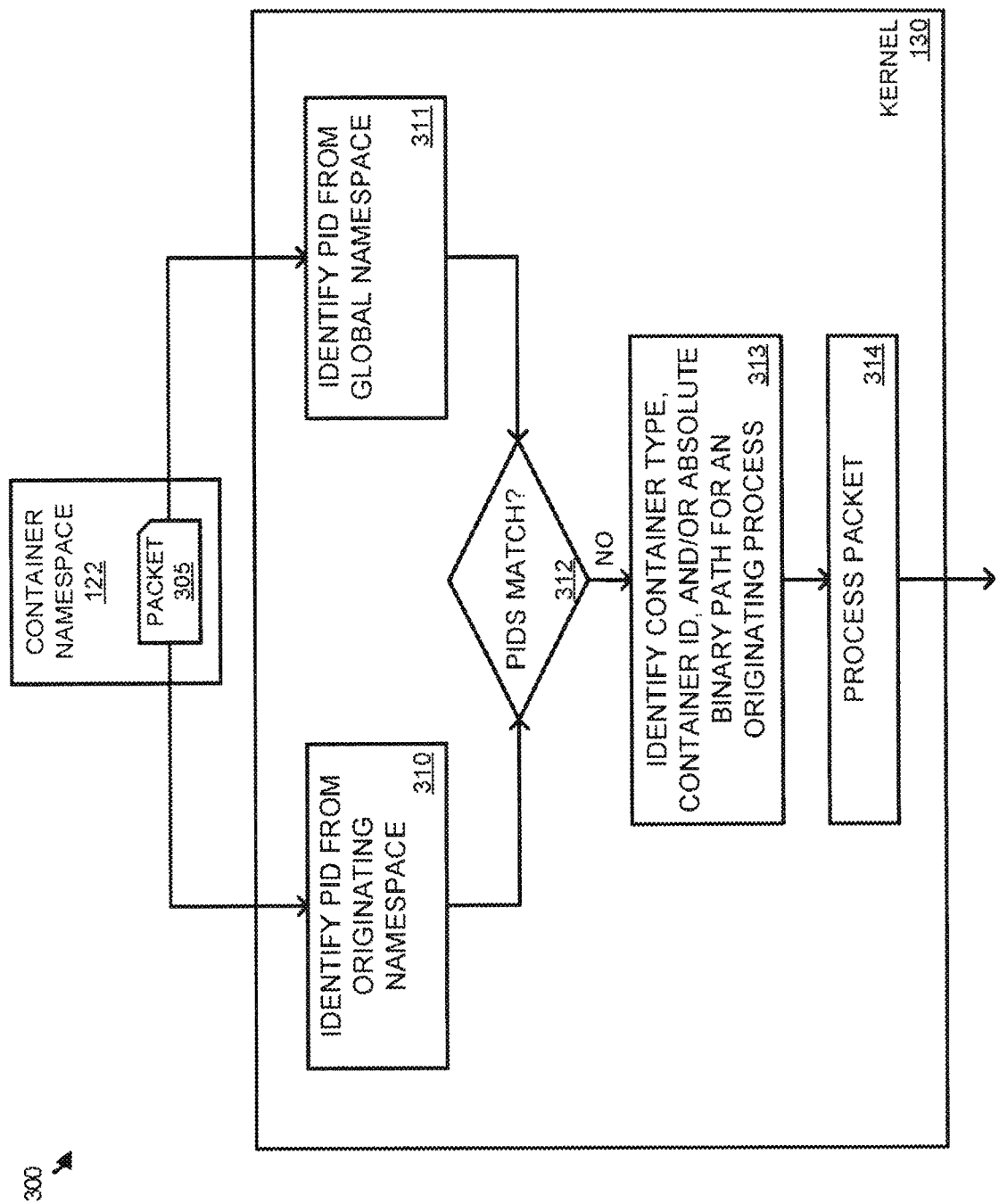
FIG. 3 illustrates an operational scenario of processing a packet from a container according to an implementation.

FIG. 3 illustrates an operational scenario 300 of processing a packet from a container according to an implementation. Operational scenario 300 includes container namespace 122 and kernel 130 from FIG. 1, and further includes packet 305 and operations 310-314 that can be implemented by kernel 130.

In operation, a container associated with container namespace 122 initiates a communication of packet 305 that is identified by kernel 130. In response to kernel 130 identifying the communication, kernel 130 initiates two operations. As a first operation 310, kernel 130 identifies a PID for packet 305 that is associated with the originating namespace. This originating namespace may correspond to a container namespace on the host computing element, or may correspond to the host namespace for processes executing locally on the host computing element. For example, a process executing locally in host namespace 123 may be allocated a PID that corresponds to the host computing element, while a process executing in a container on host computing element 101 may be allocated a PID that corresponds to the individual container. Thus, each container namespace of container namespaces 120-122 may have their own unique PID set for processes executing therein.

In addition to identifying the PID from the originating namespace, kernel 130 will further provide second operation 311 to identify a PID for the originating process from the global namespace. As described previously, each container operating on host computing element 101 may include their own unique PID values for processes executing thereon. However, in addition to the PID for the local container namespace, each process is further allocated a global namespace PID that can be used to differentiate between processes across different containers. As an example, although a process of processes 140 may be allocated a first PID in container namespace 120, the PID may be the same as another process of processes 141 in container namespace 121. Accordingly, in addition to the PID for the local namespace, each process, both within the container namespaces and in the host namespace, is allocated a global PID that is used to differentiate between the processes in kernel 130. As a result, while two processes may have the same PID within their respective containers, the processes will have a different PID within the global namespace.

Once the two PIDs are identified for the originating process, operation 312 is performed to determine whether the local namespace PID matches the global namespace PID. If the two values match, then kernel 130 may determine that the packet originated from a process that is not operating within a container, and may process the packet as originating from the host namespace. However, as depicted in operational scenario 300, when the PIDs do not match for the originating process, kernel 130 may identify that the packet originated from within a container. In particular, when the PIDs do not match, the local namespace PID (local to the container) will be mapped to another PID that corresponds to the global namespace of the host, whereas when the PIDs do match and the packet originates from the host namespace, the host namespace PID is equivalent to the global namespace PID for the packet.

After it is determined that packet 305 was generated from a process in a container, operation 313 identifies a container type, a container identifier, and/or an absolute binary path for the originating process. In some implementations, this information may be obtained via one or more function calls that can obtain the required information regarding the container and the corresponding process. Once the information is identified, operation 314 processes the packet using the identified information for the packet. As an example, kernel 130 may include one or more data structures, such as tables or arrays, that can be compared against the information obtained for the container and process. For example, the container identifier and the container type may be used in conjunction with a table to determine whether the packet is permitted to proceed, whether the packet is to be blocked, or any other similar operation with respect to the packet.

Although demonstrated in the previous example as receiving a packet from a container, it should be understood that similar operations may be implemented for packets that are to be received by a process on the host computing element. For example, when a packet is received over a network interface for the host computing element, kernel 130 may determine whether the packet comprises a connection establishment packet (e.g. a synchronization or acknowledgment packet), and if the packet comprises a connection establishment packet, executing operations 310-314 to determine whether the packet should be forwarded to a destination process. Specifically, kernel 130 may determine whether the packet is destined for a process executing in a container or a process executing in the host namespace based on the PIDs associated with the destination process. Once it is determined that the packet is destined for a container namespace, kernel 130 may identify supplemental information for the container, wherein the information may include a container identifier, a container type, or an absolute binary path to the destination process in the container. Based on the supplemental information, kernel 130 may forward the packet for delivery to the appropriate container and process, may block the packet from being forwarded to the destination computing element, may modify the packet prior to forwarding the packet to the destination container, or providing any other similar operation with respect to the received packet.

Figure 4:
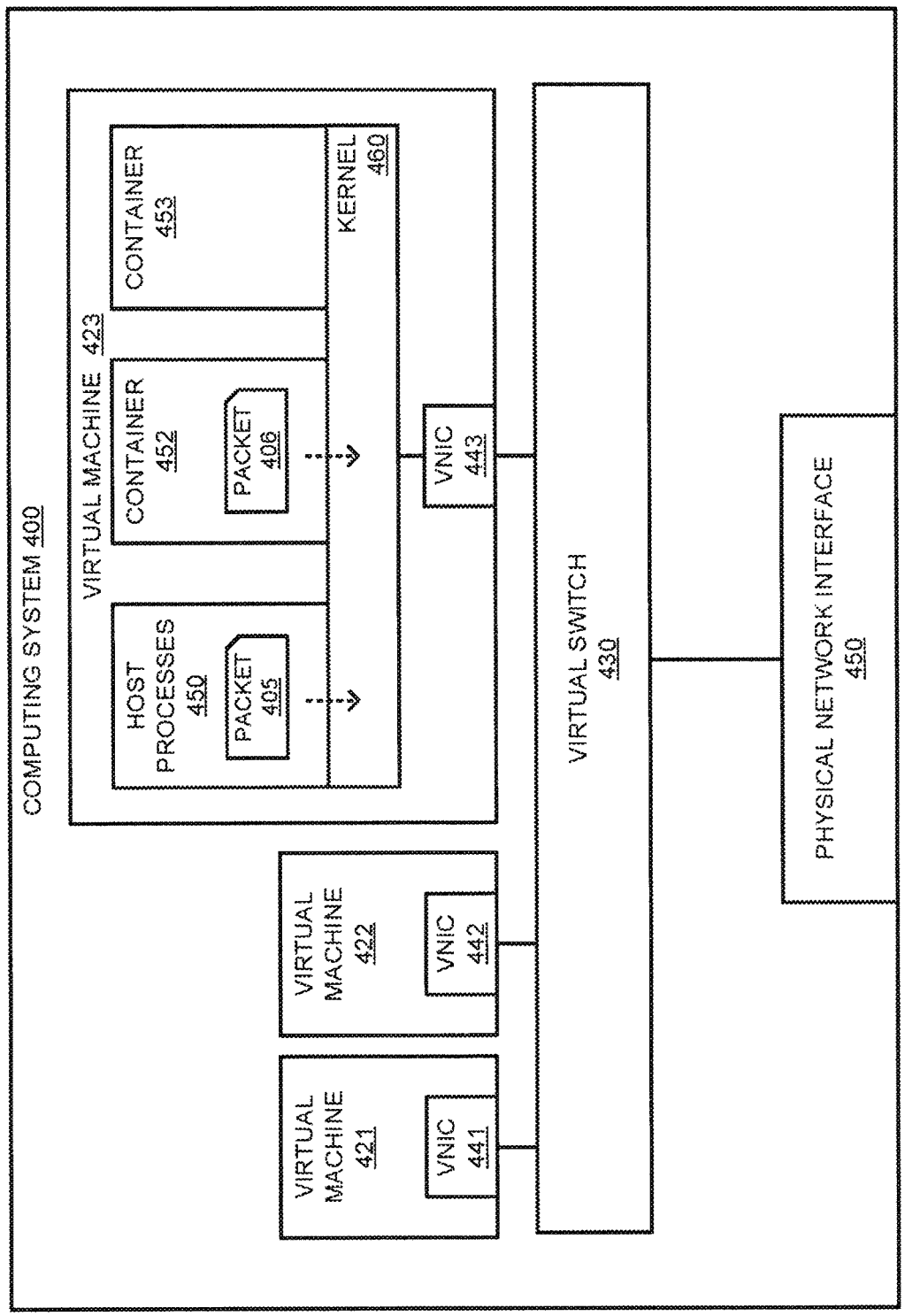
FIG. 4 illustrates a host computing system according to an implementation.

FIG. 4 illustrates a host computing system 400 according to an implementation. Computing system 400 includes virtual machines 421-423, virtual switch 430, and physical network interface 450. Virtual machines 421-423 further include virtual network interfaces (VNICs) 441-443 that provide a network connection to virtual switch 430 executing on host computing system 400. Virtual machine 423 further includes host processes 450, containers 452-453, and kernel 460.

In operation, virtual machines 421-423 are instantiated on computing system 400 via a hypervisor which may operate as part of or alongside virtual switch 430. The hypervisor may abstract the physical computing components of computing system 400 and provide virtual computing elements to the individual virtual machines. These virtual computing elements may include processing resources, memory resources, network resources, and the like. In the present implementation, each virtual machine of virtual machines 421-423 is allocated a corresponding VNIC of VNICs 441-443 that permits the virtual machines to communicate with other virtual machines on computing system 400, as well as communicate with other physical computing elements via physical network interface 450.

In the current implementation, virtual machine 423 includes kernel 460 that provides a platform for host processes 450 operating in a host namespace for virtual machine 423, and containers 452-453 that operate in each of their own respective namespaces. These containers may have private access to the operating system of virtual machine 423 with their own namespace, file system structure, and network interfaces. Here, as a first example, a host process of host processes 450 generates packet 405, which is identified by kernel 460. In some implementations, in identifying the packet, kernel 460 may implement hooks which are used to identify specific packets to and from the executing processes. For example, a hook may be used by kernel 460 to identify packets that are used in establishing a connection by processes on virtual machine 423. These connection establishment packets may include acknowledgment packets or synchronization packets that are used in TCP communication establishment. When packet 405 is generated, and identified by kernel 460, kernel 460 may determine whether the packet was generated by a process in a container or a process executing outside of a container. In making the determination, kernel 460 may identify PIDs associated with the originating process. These PIDs may include PID in a local namespace for the packet, such as a PID in the container or a PID in the host namespace, and may further include the PID in the global namespace, which provides a unique identifier for packets both outside of the containers as well as inside the containers. In the present implementation, because packet 405 was generated from a host process in host processes 450, the local namespace PID would match that of the global namespace PID. Accordingly, kernel 460 may process the packet based on the PID, which may include forwarding the packet, blocking the packet, or providing any other similar operation with respect to the packet.

In addition to the transfer of packet 405, kernel 460 may also identify a transfer of packet 406 to another computing element. This transfer of packet 406 may be a transfer to another container, another virtual machine, or another physical computing system in some implementations. Similar to the processes provided on packet 405, kernel 460 may use hooks to determine whether the egress packet from container 452 comprises a connection establishment packet. If the packet comprises a connection establishment packet, kernel 460 may determine whether the packet originates from a container based on the PIDs associated with the packet, identify supplemental information associated with the container when the packet originates from a container, and process the packet in accordance with the supplemental information. Here, because packet 406 originates from container 452, kernel 460 will identify supplementary information associated with container 452. This information may include an identifier associated with container 452 and assigned by the virtual machine when the container was initiated, a container type, an absolute binary path to the process in container 452 that initiated the communication, or some other similar information related to the container and the process operating therein. In some implementations, kernel 460 may initiate one or more function calls to derive the required information about the container. Once the information is identified, the supplementary information may be compared to information that is maintained in one or more data structures to determine how the packet should be processed. As an example, when the container identifier and the container type is identified, the information may be compared to a data structure to determine whether the packet can be forwarded to the destination computing element. If the packet is approved, then kernel 460 may forward the packet to a local destination container or may forward the packet to VNIC 443, wherein VNIC 443 may forward the packet to another virtual machine or to another physical computing element via virtual switch 430 and physical network interface 450. In contrast, if the packet is not approved for forwarding, such as when the container identifier is not permitted to forward packets to a corresponding destination, kernel 460 may block the packet, preventing the packet from being forwarded to another container, another virtual machine, or another physical computing system.

Although demonstrated in the previous examples as identifying and processing packets that are received from locally executing processes, it should be understood that similar operations may be performed on packets that are obtained via VNIC 443. In particular, when a packet is identified from VNIC 443, kernel 460 may use hooks to determine if the packet comprises a communication establishment packet, and subsequently, determine whether the packet is destined for a process operating in a container. Once it is determined that the packet is destined for a process in a container, kernel 460 may identify supplemental information for the container and process the packet based at least in part on the supplemental data for the container. This processing of the packet may include determining whether the packet should be forwarded to the destination container, prevented from being forwarded to the destination container, or any other similar operation with respect to the packet.

FIG. 5 illustrates a data structure 500 for managing packets according to an implementation. Data structure 500 includes columns for container type 510, container identifier (ID) 511, absolute path 512, supplemental addressing information 513, and action 514. Supplemental addressing information 513 may include internet protocol (IP) addressing traits, media access control (MAC) addressing traits, or some other similar addressing traits for a packet.

As described herein, in monitoring network traffic on a host computing element, a kernel may use hooks to identify packets with specific traits. For example, the kernel may use hooks to identify packets that are used in establishing a connection between a process on the host computing element and a second process. In determining whether the connection packet should be permitted, the kernel may first determine whether the process on the host computing element comprises a process executing inside of a container, or a process executing outside of a container. To make the determination, the kernel may identify PIDs associated with the container (a local namespace PID for the process and a global namespace PID for the container), and compare the PIDs to determine whether the relevant process is executing in a container. When the PIDs do not match, the kernel may identify supplementary information associated with the container for the relevant process, such as the container type for the container, the container identifier on the host computing element, and the absolute binary path for the relevant process. Once the information is identified, the information may be compared to information in data structure 500 to provide the required operations.

Here, when the information is identified for the relevant container, the information may be compared to the information maintained in data structure 500. For example, if the supplementary information identified a container type of type 520, a container identifier of identifier 525, an absolute path of 530, and supplemental addressing information 535, then the packet may be permitted to be forwarded. In contrast, if a packet were identified included a container type of type 521, a container identifier of identifier 526, an absolute path of 531, and supplemental addressing information 536, the packet may be blocked, preventing the packet from being received at the intended destination.

While demonstrated in the example of FIG. 5 with four columns of information in determining how a packet should be processed, it should be understood that additional or fewer columns may be used in determining how to process a packet. As an example, the container identifier may be used exclusively in determining how the packet should be processed. Additionally, while the example, of data structure 500 includes supplemental addressing information for a packet, it should be understood that this information may not be used in determining how the packet is processed.

Figure 6:
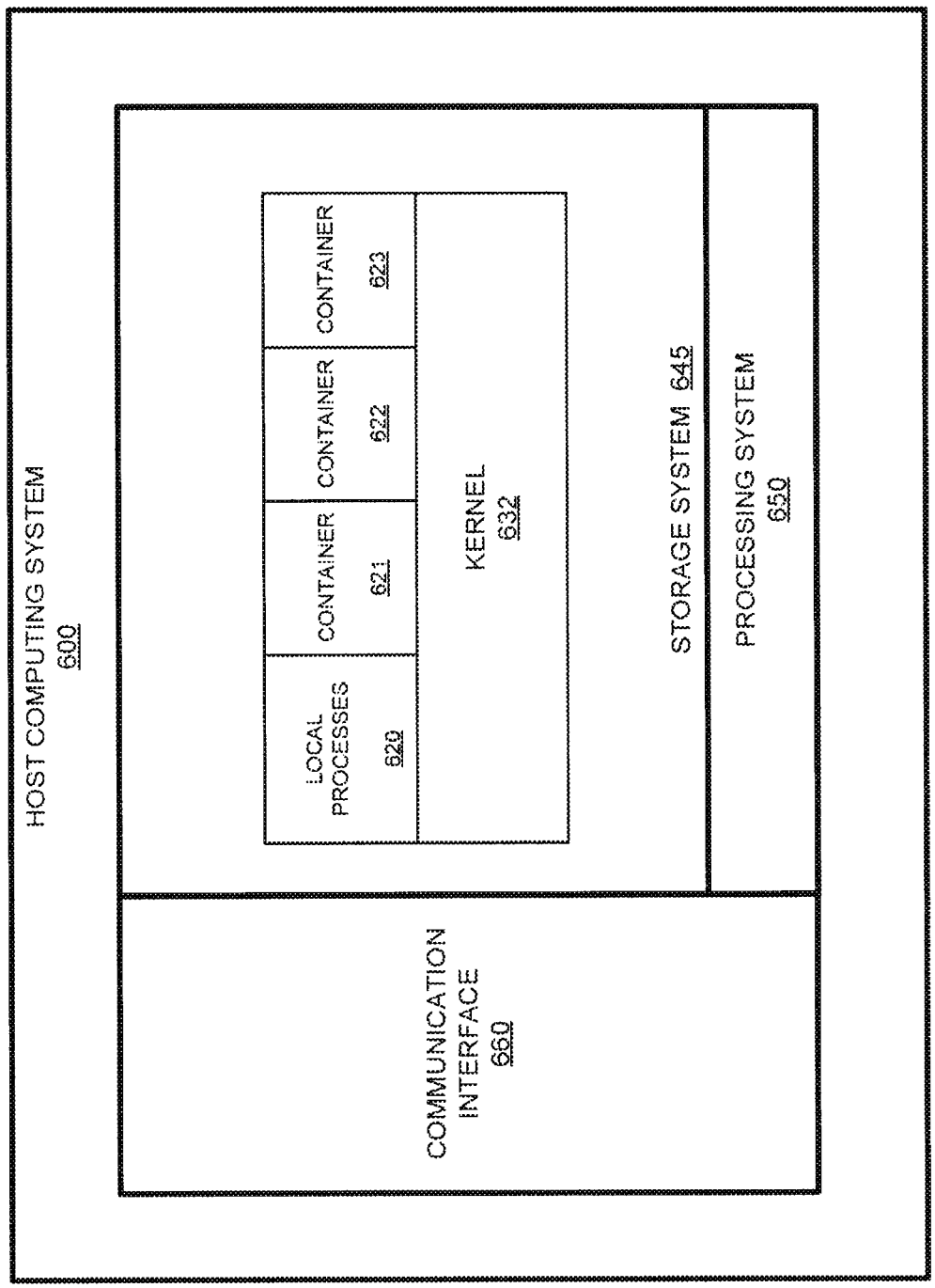
FIG. 6 illustrates a host computing system according to an implementation.

FIG. 6 illustrates a host computing system 600 according to an implementation. Host computing system 600 is representative of any computing system or systems with which the various operational architectures, processes, scenarios, and sequences disclosed herein for a host can be implemented. Host computing system 600 is an example of computing element 101 of FIG. 1, although other examples may exist. Host computing system 600 includes storage system 645, processing system 650, and communication interface 660. Processing system 650 is operatively linked to communication interface 660 and storage system 645. Communication interface 660 may be communicatively linked to storage system 645 in some implementations. Host computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is an example of a physical network interface that can be configured to communicate with other computing systems to provide required operations for the processes executing on computing system 600.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises local processes 620, containers 621-623 and kernel 632, which is representative of a host operating system kernel for local processes 620 and containers 621-623. The operating software on storage system 645 may further include utilities, drivers, network interfaces, applications, or some other type of software. When read and executed by processing system 650 the operating software on storage system 645 directs host computing system 600 to operate as described herein.

In at least one implementation, kernel 632 provides a platform for the execution of containers 621-623, wherein containers 621-623 share resources provided by kernel 632, while maintaining unique namespaces for the processes and files operating therein. In the present implementation, kernel 632 may be configured to identify connection establishment packets related to processes operating in either local processes 620 or containers 621-623. These connection establishment packets may comprise egress packets from the processes or ingress packets destined for a process executing on the computing element. As an example, once a connection establishment packet is identified that is destined for a process on the computing element, kernel 632 may determine whether the packet is destined for a process operating in a container or a process operating external to a container (i.e. local processes 620). In making the determination, kernel 632 may identify PIDs for the related process, and compare the PIDs to determine whether the relevant process is executing in a container. If the process is executing in a container, kernel 632 may obtain supplementary information about the destination container and process, and determine actions for the packet based on the supplementary information, wherein the actions may permit the packet to be transferred to the requested destination, may block the packet, or may provide any other similar action with respect to the packet.

In some implementations, kernel 632 is representative of a host operating system kernel with local processes 620 and containers 621-623 executing thereon. In other implementations, kernel 632 is representative of a virtual machine kernel that is executing on a host hypervisor of computing system 600.

Returning to the elements of FIG. 1, host computing element 101 may comprise a physical host computing system or a virtual machine executing on a physical host computing system. The host computing system may comprise communication interfaces, network interfaces, processing systems, computer systems, microprocessors, storage systems, storage media, or some other processing devices or software systems, and can be distributed among multiple devices. The host computing system may comprise software such as an operating system, logs, databases, utilities, drivers, networking software, and other software stored on a computer-readable medium.

Other computing elements 102 may comprise physical computing systems, virtual machines, containers, or some other similar type of computing element. Other computing elements 102 may comprise communication interfaces, network interfaces, processing systems, computer systems, microprocessors, storage systems, storage media, or some other processing devices or software systems, and can be distributed among multiple devices. Other computing elements 102 may comprise software such as an operating system, logs, databases, utilities, drivers.

Communication between computing elements 101-102 may use metal, glass, optical, air, space, or some other material as the transport media. Communication between computing elements 101-102 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing elements 101-102 may be a direct link or can include intermediate networks, systems, or devices, and can include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of processing packets on a host, the method comprising:
   identifying a packet in a kernel of the host;
   determining whether the packet originates from a container namespace corresponding to a container on the host or a host namespace corresponding to the host based on at least one identifier associated with an originating process for the packet; and
   when the packet originates from a container namespace, processing the packet in the kernel of the host based on supplemental information for a container associated with the container namespace, wherein the supplemental information comprises a container type or a container identifier for the container.

2. The method of claim 1, wherein the host comprises a virtual machine on a physical computer.

3. The method of claim 1, wherein the host comprises a physical computer.

4. The method of claim 1, wherein the supplemental information further comprises an absolute binary path to the originating process in the container.

5. The method of claim 1 further comprising:
determining that the packet comprises an establishment packet; and
wherein determining whether the packet originates from a container namespace or the host namespace occurs in response to determining that the packet comprises an establishment packet.

6. The method of claim 5, wherein the connection establishment packet comprises an acknowledgment packet or a synchronization packet.

7. The method of claim 1, wherein the at least one identifier comprises a process identification number (PID) for a local namespace of the packet and a PID for a global namespace of the packet.

8. The method of claim 7, wherein determining whether the packet originates from a container namespace corresponding to a container on the host or a host namespace corresponding to the host based on at least one identifier associated with an originating process for the packet comprises:
determining whether the packet originates from a container namespace corresponding to determining whether the packet originates from a container namespace corresponding to a container on the host computing element or the host namespace corresponding to the host based on whether the PID for the local namespace matches the PID for the global namespace, wherein the packet originates from a container namespace when the PID for the local namespace does not match the PID for the global namespace.

9. A computing apparatus comprising:
a storage system;
a processing system operatively coupled to the storage system; and
program instructions stored on the storage system to process packets on a host that, when executed by the processing system, direct the computing apparatus to:
identify a packet in a kernel of the host;
determine whether the packet originates from a container namespace corresponding to a container on the host or a host namespace corresponding to the host based on at least one identifier associated with an originating process for the packet; and
when the packet originates from a container namespace, processing the packet in the kernel of the host based on supplemental information for a container associated with the container namespace, wherein the supplemental information comprises a container type or a container identifier for the container.

10. The computing apparatus of claim 9, wherein the host comprises a virtual machine on a physical computer.

11. The computing apparatus of claim 9, wherein the supplemental information further comprises an absolute binary path to the originating process in the container.

12. The computing apparatus of claim 9, wherein the program instructions further direct the computing apparatus to:
determine that the packet comprises an establishment packet; and
wherein determining whether the packet originates from a container namespace or the host namespace occurs in response to determining that the packet comprises an establishment packet.

13. The computing apparatus of claim 12, wherein the connection establishment packet comprises an acknowledgment packet or a synchronization packet.

14. The computing apparatus of claim 9, wherein the at least one identifier comprises a process identification number (PID) for a local namespace of the packet and a PID for a global namespace of the packet.

15. The computing apparatus of claim 14, wherein determining whether the packet originates from a container namespace corresponding to a container on the host or a host namespace corresponding to the host based on at least one identifier associated with an originating process for the packet comprises:
determining whether the packet originates from a container namespace corresponding to determining whether the packet originates from a container namespace corresponding to a container on the host computing element or the host namespace corresponding to the host based on whether the PID for the local namespace matches the PID for the global namespace, wherein the packet originates from a container namespace when the PID for the local namespace does not match the PID for the global namespace.

16. An apparatus comprising:
one or more computer readable storage media; and
program instructions stored on the one or more computer readable storage media to process packets on a host that, when executed by at least one processor, direct the at least one processor to:
identify a packet in a kernel of the host;
determine whether the packet originates from a container namespace corresponding to a container on the host or a host namespace corresponding to the host based on at least one identifier associated with an originating process for the packet; and
when the packet originates from a container namespace, processing the packet in the kernel of the host based on supplemental information for a container associated with the container namespace, wherein the supplemental information comprises a container type or a container identifier for the container.

17. The apparatus of claim 16, wherein the host comprises a virtual machine on a physical computer.

18. The apparatus of claim 16, wherein the program instructions further direct the at least one processor to:
determine that the packet comprises an establishment packet; and
wherein determining whether the packet originates from a container namespace or the host namespace occurs in response to determining that the packet comprises an establishment packet.

19. The apparatus of claim 18, wherein the connection establishment packet comprises an acknowledgment packet or a synchronization packet.

20. The apparatus of claim 16, wherein the at least one identifier comprises a process identification number (PID) for a local namespace of the packet and a PID for a global namespace of the packet, and wherein determining whether the packet originates from a container namespace corresponding to a container on the host or a host namespace corresponding to the host based on at least one identifier associated with an originating process for the packet comprises:
determining whether the packet originates from a container namespace corresponding to determining whether the packet originates from a container namespace corresponding to a container on the host computing element or the host namespace corresponding to the host based on whether the PID for the local namespace matches the PID for the global namespace, wherein the packet originates from a container namespace when the PID for the local namespace does not match the PID for the global namespace.

\* \* \* \* \*